US011853036B2

(12) United States Patent
Hunsaker et al.

(10) Patent No.: US 11,853,036 B2
(45) Date of Patent: Dec. 26, 2023

(54) COMPUTER SYSTEMS FOR INTEGRATION WITH AGRICULTURAL OPERATIONS

(71) Applicant: ACUITUS AG, INC., Lehi, UT (US)

(72) Inventors: Christopher Hunsaker, Lehi, UT (US); Kendal Hunsaker, Lehi, UT (US); Dave King, Lehi, UT (US); Evan Orme, Lehi, UT (US); Jason Hill, Lehi, UT (US); Daniel Piquet, Lehi, UT (US); Jonathan Nelson, Lehi, UT (US)

(73) Assignee: ACUITUS AG, INC., Lehi, UT (US)

( * ) Notice: Subject to any disclaimer, the term of this patent is extended or adjusted under 35 U.S.C. 154(b) by 189 days.

(21) Appl. No.: 17/416,935

(22) PCT Filed: Dec. 20, 2019

(86) PCT No.: PCT/US2019/067788
§ 371 (c)(1),
(2) Date: Jun. 21, 2021

(87) PCT Pub. No.: WO2020/132410
PCT Pub. Date: Jun. 25, 2020

(65) Prior Publication Data
US 2022/0083029 A1 Mar. 17, 2022

Related U.S. Application Data

(60) Provisional application No. 62/784,366, filed on Dec. 21, 2018.

(51) Int. Cl.
*G05B 19/4155* (2006.01)
*G06Q 50/02* (2012.01)

(52) U.S. Cl.
CPC ......... *G05B 19/4155* (2013.01); *G06Q 50/02* (2013.01); *G05B 2219/45017* (2013.01)

(58) Field of Classification Search
CPC ...... G05B 19/4155; G05B 2219/45017; G06Q 50/02; H04W 4/029; H04W 4/44
See application file for complete search history.

(56) References Cited

U.S. PATENT DOCUMENTS

2001/0016788 A1   8/2001  Hauwiller et al.
2004/0193349 A1   9/2004  Flann et al.
(Continued)

OTHER PUBLICATIONS

R.D. Grisso, P.J. Jasa, D.E. Rolofson, "Analysis of Traffic Patterns and Yield Monitor Data for Field Efficiency Determination." vol. 18(2): 171-178. Applied Engineering in Agriculture. American Society of Agricultural Engineers. (Year: 2002).*

(Continued)

*Primary Examiner* — Tejal Gami
(74) *Attorney, Agent, or Firm* — WORKMAN NYDEGGER; Logan Christenson; John Guynn

(57) ABSTRACT

The present disclosure describes computer systems and computer-implemented methods for use in an agricultural operation. Vehicle location information for at least one agricultural vehicle is received, and the vehicle location information is used to determine a vehicle path. Vehicle state information is received from the vehicle and is used to determine whether the vehicle is in a working or non-working state. The vehicle path is then rendered on a map display, with the map display visually distinguishing between sections of the vehicle path traversed while the vehicle is in the working state and sections of the vehicle path traversed while the vehicle is in the non-working state.

15 Claims, 6 Drawing Sheets

(56) References Cited

U.S. PATENT DOCUMENTS

| | | |
|---|---|---|
| 2009/0118904 A1 | 5/2009 | Birnie |
| 2011/0213531 A1* | 9/2011 | Farley ................ A01D 41/1275 701/50 |
| 2014/0121882 A1* | 5/2014 | Gilmore ............... G05D 1/0295 701/25 |
| 2015/0160655 A1 | 6/2015 | Korthals et al. |
| 2016/0066505 A1* | 3/2016 | Bakke ................ A01D 41/1274 700/275 |
| 2017/0041407 A1 | 2/2017 | Wilbur et al. |
| 2017/0192431 A1* | 7/2017 | Foster ................ G05D 1/0217 |

OTHER PUBLICATIONS

International Search Report issued in PCT/US2019/067788 filed Apr. 23, 2020.

\* cited by examiner

COMPUTER SYSTEMS FOR INTEGRATION WITH AGRICULTURAL OPERATIONS

BACKGROUND

Agricultural productivity has increased in the modern era due to such advances as mechanization, better crop varieties, more effective fertilizer use, better irrigation practices, and pesticide and herbicide development. As farms become more productive and efficient, food prices may decrease and food supplies may become more stable. However, despite these advances, several inefficiencies remain in a typical farming process, and there is an ongoing need for improvements which increase production efficiency, increase crop quality, and/or decrease operational costs.

BRIEF DESCRIPTION OF THE DRAWINGS

In order to describe various features and concepts of the present disclosure, a more particular description of certain subject matter will be rendered by reference to specific embodiments which are illustrated in the appended drawings. Understanding that these figures depict just some example embodiments and are not to be considered to be limiting in scope, various embodiments will be described and explained with additional specificity and detail through the use of the accompanying drawings in which.

DETAILED DESCRIPTION

Introduction

The present disclosure relates to sensors, sensor assemblies, computer systems, computer-implemented methods, and computer hardware storage devices configured to be integrated with agricultural equipment to provide one or more benefits to an agricultural operation.

The farming process often includes several operational inefficiencies, including a lack of coordination between different operators (such as between harvesters and loading trucks), difficulty in tracking where all vehicles and operators are at a given time, difficulty in determining whether a crew is on schedule for a particular task, and difficulty in determining what changes could be made to meet time demands and/or increase operational efficiencies. These problems can have a real-world impact in terms of both production efficiency, overall production, and costs. For example, inefficient coordination of separate agricultural vehicles or inefficient utilization of available agricultural assets wastes fuel and operator time. Moreover, inefficient harvesting due to mismanagement of assets leads to suboptimal yields and/or a lower quality product. For example, harvesting too early removes the crop from the field and misses time for additional potential growth, but harvesting too late can lead to spoilage, frost damage, and/or other losses.

Such problems are further compounded by certain technological issues that are inherent to agricultural technology. While tracking of a vehicle using GPS data is known, such basic tracking cannot accurately characterize tractor movements in a manner that enables accurate monitoring and rendering of operational progress. For example, not all detected tractor movements will necessarily correspond to actual work being performed. Moreover, inaccuracies inherent in the GPS vehicle location data can make it difficult or impossible to render vehicle path information in a way that usefully corresponds to actual tractor movement.

Embodiments described herein provide farm managers and/or other users with the ability to monitor the progress of an ongoing agricultural operation in real time, without requiring the user to travel to multiple work sites for visual inspection. Embodiments described herein also solve inherent technological problems which have impeded conventional approaches to accurately rendering, monitoring, and modulating agricultural operation progress. Embodiments described herein may therefore be utilized to increase the productivity and/or efficiency of agricultural operations.

Computer System Overview

Figure 1:
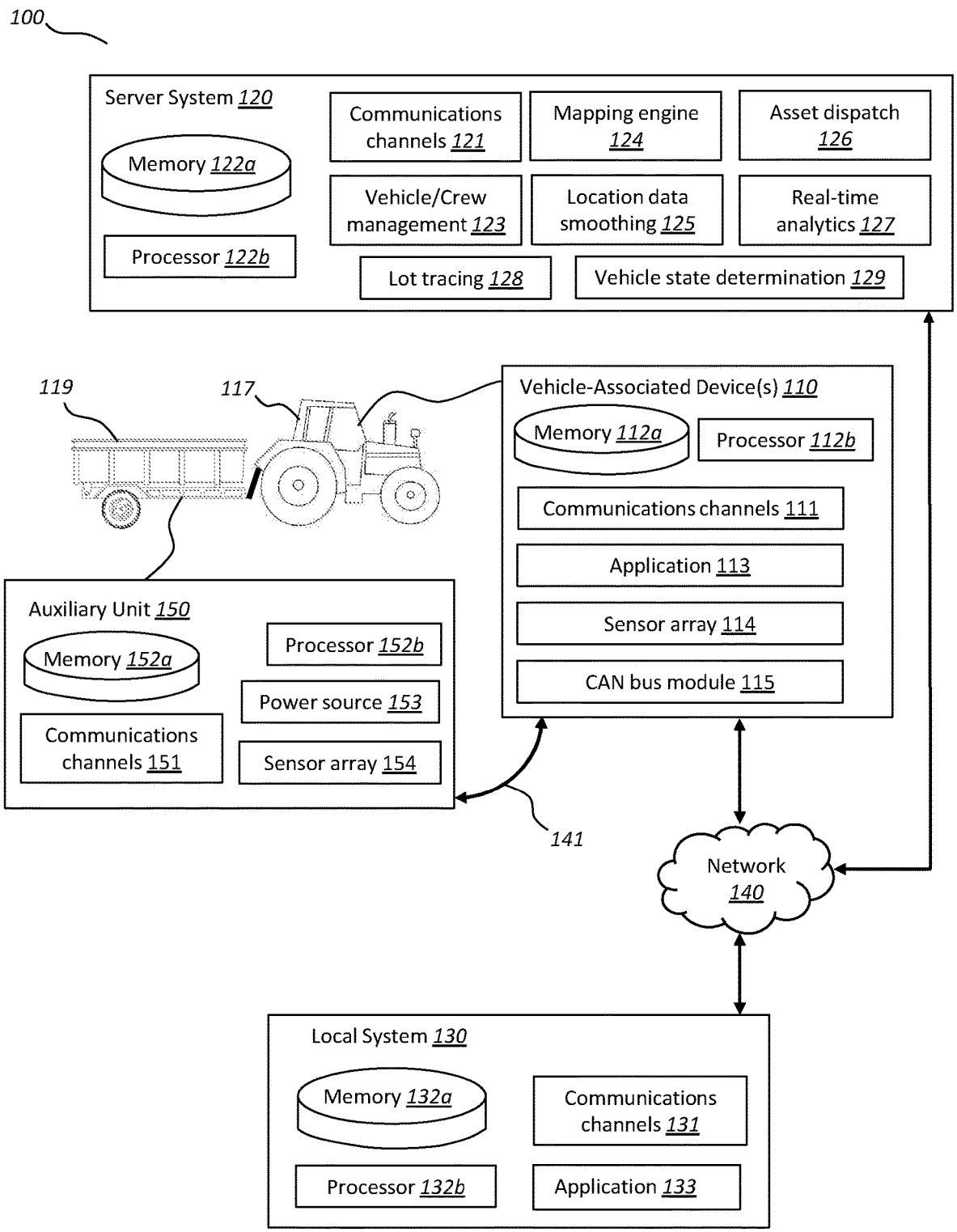
FIG. 1 illustrates an exemplary computing system which may be integrated into an agricultural operation.

FIG. 1 illustrates an exemplary computer system 100 for integration into an agricultural operation. The illustrated embodiment includes a vehicle-associated device 110 and a server system 120. The system 100 may also include a local system 130. The vehicle-associated device 110, server system 120, and local system 130 are connected by (or are part of) a network 140. The network 140 may communicatively couple the vehicle-associated device 110 to the server system 120 and/or local system 130 using one or more of a cellular network, Local Area Network ("LAN"), a Wide Area Network ("WAN"), or the Internet, for example.

The vehicle-associated device 110, server system 120, and local system 130 may be configured to communicate with each other through respective communications channels 111, 121, and 131. The communications channels 111, 121, and 131 include hardware and/or suitable application programming interfaces (APIs) that enable the respective systems to communicate and share data with one another and/or with other systems (including other systems within a distributed computing environment and/or other third-party systems).

The vehicle-associated device 110 may be associated with an agricultural vehicle 117 such as a tractor, harvester (e.g., potato harvester, chopper/forage harvester, combine harvester), windrower, sprayer, loading truck, or the like. In some embodiments, the vehicle 117 includes one or more implements 119. For example, a tractor may be operatively coupled to a plow (e.g., moldboard plow, chisel plow), cultivator (e.g., disc, harrow, crumbler), leveler, loading wagon, planter, pull-behind harvester, or the like. One of skill in the art will understand that some operations may be accomplished using either a vehicle coupled to an implement or using a vehicle tailored itself for a particular operation (e.g., a pull-behind forage harvester vs. a self-propelled forage harvester).

The illustrated vehicle-associated device 110 may represent a single device or multiple devices each associated with the vehicle. For example, in some embodiments the vehicle-associated device(s) 110 may include a mobile device such as a mobile phone. Some embodiments may additionally or alternatively include a separate, non-phone device such as a device capable of receiving CAN bus data from the vehicle.

As shown, the vehicle-associated device 110 includes memory 112a, a processor 112b, and communications channels 111. The communications channels 111 may include a cellular modem (e.g., configured for 3G or LTE network communications, or other suitable cellular communications) for communicating with the network 140 from remote agricultural operation locations.

The vehicle-associated device 110 may have an application 113 for controlling the receipt of agricultural operation data and the communication of the agricultural operation data with the network 140. The application 113 may also control a user interface which is operable to receive user input and to display operations of the system 100 such as rendering agricultural operation maps, agricultural operation progress, vehicle state, location, and/or path information, dispatch instructions, and other operations of the system 100 described herein.

The sensor array 114 includes one or more sensors configured for detecting a state of the vehicle 117 and/or implement 119. A mobile device typically includes several integrated sensors which can be utilized to provide useful contextual information about the state of the vehicle 117 and/or implement 119. For example, a conventional mobile device may include an accelerometer, gyroscope, thermometer, pressure sensor, GPS unit, and/or other sensors. As explained in more detail below, data from such mobile device sensors may be utilized to determine operation information such as vehicle position, vehicle path, and whether the vehicle is in a "working" or "non-working" state.

Conventional mobile devices such as mobile phones are not typically capable of communicating with the CAN bus of the vehicle. In embodiments that make use of such data, a non-phone vehicle-associated device 110 may be additionally or alternatively included and configured with CAN bus communications capability. In such embodiments, a CAN bus module 115 is configured for receiving output from the CAN bus of the vehicle. Data from the CAN bus may include vehicle speed, vehicle engine speed, engine torque (e.g., typically provided as "percent torque required to overcome friction"), power take-off (PTO) status/engagement, hydraulic system state, etcetera. A non-phone vehicle-associated device may include sensors similar to those described above for a conventional mobile phone. For example, in the absence of a mobile phone with integrated sensors, the sensor array 114 may include a GPS unit configured to detect the vehicle's geolocation (e.g., a relatively inexpensive GPS chip configured to communicate using common cellular networks), an accelerometer, a gyroscope, and the like.

As shown, the system 100 may also include one or more auxiliary units 150 operatively coupled to the vehicle 117 and/or associated implement 119. For example, the auxiliary unit 150 may be configured to be selectively attachable directly to the vehicle 117 or implement 119. In some embodiments, the auxiliary unit 150 is a contained unit having a strong magnet (e.g., a neodymium magnet) that allows direct attachment to a suitable metal portion of the vehicle 117 or implement 119. The auxiliary unit 150 is preferably sealed and weatherproof to allow for direct attachment to an external portion of the vehicle 117 and/or implement 119.

The sensor array 154 within the auxiliary unit 150 may include, for example, one or more proximity/position sensors, optical sensors (e.g., camera), weight sensors (e.g., load cells, strain gauges), temperature sensors (e.g., infrared imaging sensor), moisture sensors, accelerometer, gyroscope, camera, microphone, GPS unit, sensors for measuring barometric pressure and/or relative humidity, and/or other sensors configured for providing desired vehicle state information. In some embodiments, for example, one or more suitable sensors may be utilized to determine the position of an attached implement, the weight within a loading wagon or truck, the temperature and/or moisture content of harvested product, etcetera. In another example, the auxiliary unit 150 may be positioned so that the thermal sensor faces the soil to allow measurement of soil surface temperature.

The auxiliary unit 150 may include memory 152a and a processor 152b. Typically, processing at the auxiliary unit 150 is relatively minimal and the auxiliary unit's primary purpose is to gather and transmit data to the vehicle-associated device(s) 110 using communication channels 111 and 151 via connection 141. Connection 141 may be a wireless connection such as an ultra-high frequency radio wave connection (e.g., Bluetooth®). The auxiliary unit 150 also includes a power source 153, which may include a battery and/or solar power components. In preferred embodiments, the auxiliary unit 150 is configured to utilize solar power.

The vehicle-associated device(s) 110 and the auxiliary unit 150 may be configured to send data via the network 140 at predetermined reporting intervals. The reporting interval may be configured to depend on the state of the vehicle 117 and/or implement 119. For example, when the vehicle 117 is active/moving, the reporting interval may be relatively short (e.g., every few seconds), whereas when the vehicle 117 is inactive (i.e., not moving), the reporting interval may be expanded (e.g., on the order of several minutes). When a connection to the server system 120 cannot be established (as may happen regularly in relatively remote agricultural operations), readings may be cached in local memory until a suitable connection is made. Upon re-connecting, the locally cached data may then be uploaded to the server system 120.

In the illustrated embodiment, the server system 120 is configured to receive data from the vehicle-associated device(s) 110 via the network 140 and to communicate with the local system 130 via the network 140 in a server-based configuration. It will be understood that the particular computer system architecture illustrated in FIG. 1 represents only an example implementation. Other embodiments may divide the described memory, modules, components, and/or functions differently among the server system 120, local system 130, vehicle-associated device(s) 110, and optionally additional computer devices. In some embodiments, memory components and/or program modules are spread across a plurality of constituent computer systems in a distributed environment. In other embodiments, memory components and program modules are included in a single integrated computer system. Accordingly, the systems and methods described herein are not intended to be limited based on the particular location at which components are located and/or at which functions are performed.

As shown, the server system 120 includes memory 122a and at least one processor 122b, and the local system 130 includes memory 132a and at least one processor 132b. The term "memory" may be used herein to refer to physical system memory, which may be volatile, non-volatile (e.g., physical storage media), or some combination of the two.

The illustrated server system 120 includes a vehicle/crew management module 123 configured to register vehicles, crews, and associated vehicle information. For example, each vehicle may be registered with data related to vehicle type, vehicle capacity, implement type (if an implement is utilized in the particular vehicle setup), implement size, and the like. The vehicle/crew management module 123 may also be configured for registering workers, assigning workers to particular vehicles, and/or grouping sets of vehicles into separate crews.

The server system 120 also includes a mapping engine 124 (which may also be referred to herein as a geolocation mapping module) configured to map the location of registered vehicles, determine vehicle paths, and construct various agriculture operation maps to enable rendering at a suitable user interface such as at an interface controlled by application 113 and/or 133. As explained in more detail below, vehicle path information may be combined with vehicle state determination information and/or sensor data to determine the portion of a farm/field that has been traversed and actually worked by the particular vehicle or the area within a field corresponding to a particular seed batch, harvested load, or vehicle/implement setting, for example.

The server system 120 also includes a location data smoothing module 125. The location data smoothing module 125 is configured to provide smoothing of vehicle location data in order to enable the generation of accurate vehicle path information. Imprecise GPS readings from the vehicle can lead to "flutter" or "drift" in the detected location of a vehicle, which can make it difficult to determine the path traversed by the vehicle and the corresponding areas of the field which have actually been worked. The location data smoothing module 125 may also function to smooth the location data through a filtering operation described in more detail below. Such smoothing beneficially enhances the effectiveness and utility of gathered vehicle path information.

The illustrated server system 120 also includes an asset dispatch module 126 configured to provide dispatch information to one or more vehicles. Dispatch instructions may include directions including the field a loading truck should travel to, a location in the field where the loading truck should travel, a particular path/route the loading truck should take to reach the field and/or to reach the harvester within the field, and/or particular gates/entry points of the field to use, for example. Where multiple harvesters are being utilized, the asset dispatch module 126 may also function to direct the loading truck to a particular harvester among the multiple harvesters. Dispatch instructions may likewise be configured for directing a truck to a particular unloading site, a particular section of the unloading site, and/or particular path/route the truck should take to get to the unloading site.

The server system 120 also includes a real-time analytics module 127 configured to receive vehicle data, mapping data, and user-specified data to determine progress information and operation estimates. A user may input information such as expected operating hours for each vehicle and/or crew, total acres to work, estimated vehicle utilization efficiency, and expected weather downtime. The real-time analytics module 127 may then determine progress based on received vehicle path information. The progress at a particular time may be compared to the original estimates.

The server system 120 also includes a lot tracing module 128 configured to enable the tracing of harvested product at a particular location within storage to a particular location in the field. Information indicating field position of a particular load may be correlated to the truck in which it was loaded and/or to the location of the load at the storage facility after delivery. For example, where spoilage, contamination, or other issues are determined at a particular location at the storage facility, the location or section in the field where the product at issue was harvested may be determined. In addition, the particular harvester, loading truck, and/or associated operators used for the particular load may be determined.

The server system 120 also includes a vehicle state determination module 129 configured to determine whether the vehicle 110 is in a "working" state or a "non-working" state. When the vehicle 117 or vehicle 117 and implement 119 combination is detected as being in a working state, any ground covered by the path of the vehicle or vehicle/implement combination is considered to have been worked (e.g., tilled, planted, cultivated, harvested). In contrast, when the vehicle or vehicle/implement combination is detected as being in a non-working state, any ground covered by the path of the vehicle or vehicle/implement combination will not be considered to have been worked. Accurately determining when vehicle movements correspond to actual work in the field beneficially enables the tracking and rendering of equipment utilization and operation progress.

For convenience, this disclosure will at times refer to a vehicle/implement combination simply as the "vehicle," particularly as related to determining whether a vehicle/implement combination is in a working state based on the position or operational status of the implement. It will be understood that different agricultural operations require different vehicle setups, and that some operations such as tillage typically depend on the position of the implement to distinguish between working and non-working states.

The vehicle state determination module 129 may also be configured to determine when certain types of vehicles such as harvesters and/or loading trucks have changed between a loaded and unloaded state. Accurately determining when a vehicle has moved between a loaded or unloaded state beneficially enables seed batch location mapping, load location mapping, and harvest yield mapping, for example. As described in greater detail herein, contextual data received from the sensors of the vehicle-associated device(s) 110 and/or auxiliary unit 150 may also be utilized by the vehicle state determination module 129 to assist in making the vehicle state determination.

The vehicle-associated device 110 and the local system 130 may include application 113 and 133, respectively, enabling the user to establish, view, manage, and control one or more farm operations. The application 113, 133 may control a user interface that may include a map rendering component for displaying vehicle locations, vehicle paths, and areas which have been worked. The user interface may include a real-time monitoring component for displaying work progress and equipment utilization and for receiving farm plan information and other input from the manager/user. The user interface may also provide tracing indicators for mapping storage location information to particular field sections.

The system 100 may also be configured to receive responsive feedback to improve operational functionality of the system over time. For example, user feedback may be utilized to improve the accuracy of the real-time analytics module 127, vehicle state determination module 129, and/or other modules described herein. In one example, user input indicating when a vehicle is in a working state as opposed to a non-working state can be compared to determinations made by the vehicle state determination module 129. Determined correlations may then be mapped so that the system can "learn" to better detect vehicle state in the future with less need for manual input or correction. Such adaptive operation may be provided using one or more machine learning algorithms known in the art. In some embodiments, the server system 120 may initially associate a default or generic profile for determining vehicle state and/or historical parameters. Subsequently, received feedback and/or historical data allows the particular profile to be more fine-tuned.

Auxiliary Sensor Unit

Figure 2:
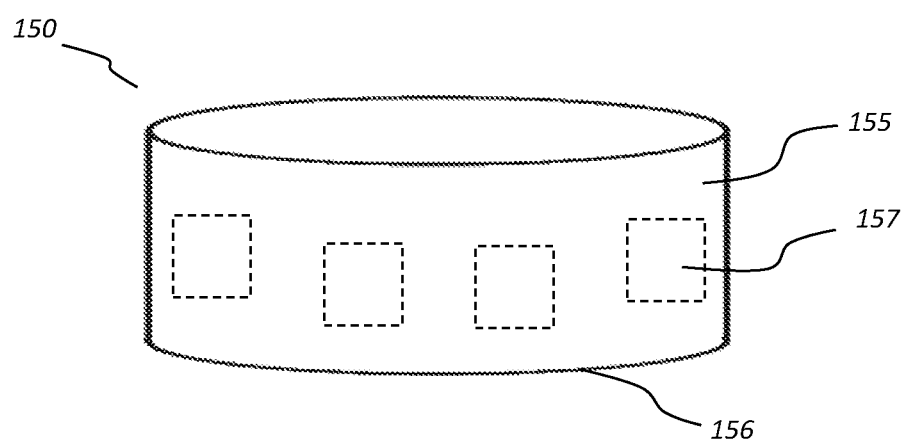
FIG. 2 illustrates an exemplary auxiliary sensor unit which may be selectively attached to a vehicle or implement.

FIG. 2 is an illustration of one possible embodiment of the auxiliary unit 150. The auxiliary sensor may include a housing 155 which holds the internal components 157 of the device (e.g., the power source, memory, processor, and sensor array as shown in FIG. 1). The housing 155 may also include at least one magnetic side 156 to enable direct attachment of the unit 150 to a suitable metal portion of the vehicle or implement. The unit 150 is preferably weatherproof (i.e., able to withstand typical outdoor farming conditions such as rain, direct sunlight, and dust), wire free, and able to maintain position on the vehicle or implement when attached despite vibrations and potentially jarring bumps. For example, the magnetic side 156 may include a relatively strong permanent magnet such as a neodymium magnet.

The auxiliary unit 150 is configured for easy attachment to a suitable location on an implement or external section of the vehicle. In some implementations, an auxiliary unit may also be positioned at other locations, such as on a boom at a storage location in order to determine whether the boom is moving or not, determine temperature, humidity, etc. when the boom is moving as an indication of the circumstances when a load was stored. An auxiliary unit 150 may also be attached to a load truck to aid in the tracking of the load truck, the determination of whether the truck is loaded or unloaded, weather conditions of the load during transport, and the like.

Vehicle State Determination

The computer system 100 may be used to implement a method for tracking the location of an agricultural vehicle and render a path traversed by the agricultural vehicle according to operational status of the vehicle (or vehicle/implement combination) over time. As an example, the vehicle 117 may be a tractor and the implement 119 may be an in-ground plow. In this example, the computer system may be used to determine when the plow is being actively used to plow the ground. Not all detected movements of the tractor will necessarily correspond to actual plowing along the tractor path. For example, the plow will often be lifted out of the ground while the tractor turns, moves to and from the field, or moves to another location within the field. By determining whether the plow is actually being pulled through the ground as the tractor moves along the detected vehicle path, the computer system provides for accurate tracking and rendering of work progress for the farm and/or field.

Some embodiments may utilize contextual data from one or more sensors of the vehicle-associated device or auxiliary device to make or assist in making the vehicle state determination. For example, while PTO engagement may be an effective means of determining the state of the vehicle in some applications, other applications may utilize implements that do not require PTO engagement (e.g., most tillage applications). Further, some tractors are too old to have easily accessible CAN bus data and/or the CAN bus data may not be in a format that is easily converted to a readable and usable form.

In some embodiments, vehicle and/or implement vibrations may be monitored using accelerometer sensors of the vehicle-associated device and/or auxiliary device. A change in sensed vibrations that exceeds a particular threshold may be identified as an operational event which may qualify as a state change. For example, the lifting and lowering of a plow results in a change in vibrations on the implement and the vehicle, and these changes may be utilized by the computer system as a factor in determining that the vehicle has changed state.

Such contextual data may be utilized with other data in order to make or augment the vehicle state determination. For example, where torque data is available (e.g., from the CAN bus), contextual sensor data may be utilized to modulate the determination based on torque. In some embodiments, GPS data may be monitored to determine the rate of elevation gain by the vehicle. Additionally, or alternatively, gyroscope and/or accelerometer measurements may be taken to determine a change in upward tilt/incline of the vehicle. Such contextual data can augment the vehicle state determination as compared to where torque data is used alone. For example, an increase in torque often suggests that the vehicle has transitioned to a working state (e.g., by lowering the plow into the ground). However, if contextual data suggests that the vehicle has also moved to an upward incline position and/or is climbing in elevation, the torque increase may be determined to be a result of the vehicle moving uphill rather than truly changing to a working state.

In operation, the incline and/or elevation measurements may drive the function of a sliding scale in which a torque threshold is adjusted according to the magnitude of the incline and/or elevation measurements. For example, a torque threshold for determining that the vehicle has transitioned to a working state may be increased according to a measured increase in elevation and/or incline and may be decreased according to a measured decrease in elevation and/or incline.

Figure 3A:
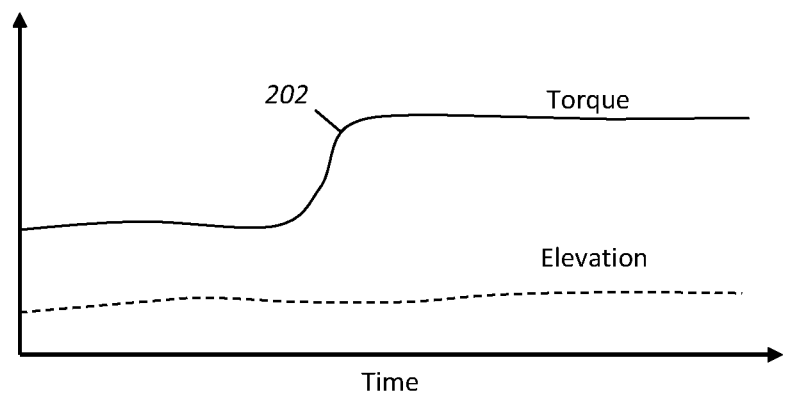
FIGS. 3A through 3C schematically illustrate a method of determining whether a vehicle is in a working state or non-working state based at least in part on a relationship between engine torque and change in elevation.
Figure 3B:
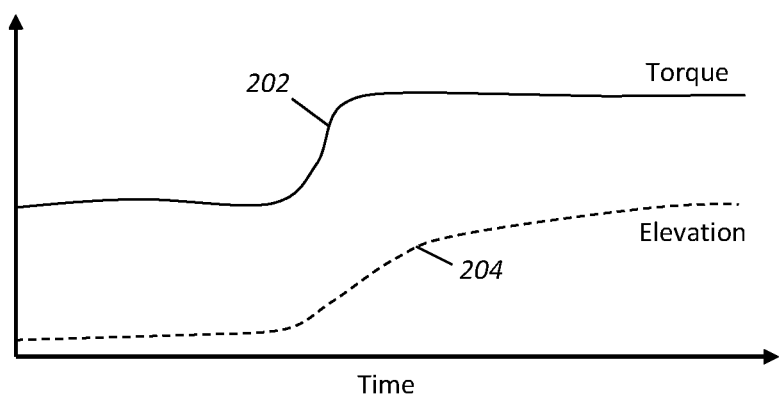

FIGS. 3A through 3B schematically illustrate this example. As shown in FIG. 3A, a relatively sudden increase in torque shown at 202, along with a relatively continuous sequence of elevation readings, is likely to be indicative of the vehicle moving from a non-working state to a working state. Similarly, a relatively sudden decrease in torque along with a relatively continuous elevation would likely indicate that the vehicle has moved from a working state to a non-working state.

FIG. 3B illustrates another situation where the relatively sudden increase in torque shown at 202 corresponds to an increase in elevation shown at 204. In this case, the increase in torque may be better explained by the increase in elevation than by the vehicle moving to a working state. For example, where the increase in torque shown at 202 may normally pass the torque threshold for determining working state, the corresponding rise in elevation shown at 204 functions to increase the torque threshold. The converse of this may also be utilized for determining when a vehicle moves between non-working and working states. That is, where a sudden decrease in torque corresponds to a drop in elevation, the torque threshold may be lowered.

Figure 3C:
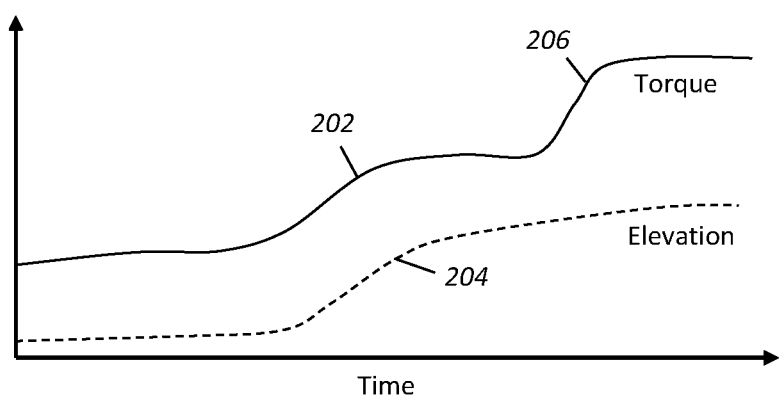

FIG. 3C illustrates another situation where a first increase in torque shown at 202 corresponds to an increase in elevation shown at 204 and where another increase in torque is shown at 206. In this situation, the first increase in torque shown at 202 may be considered to be a result of the elevation gain at 204 rather than a transition to a working state. However, the second increase in torque shown at 206 does not sufficiently correspond to an increase in elevation and is therefore indicative of the vehicle entering a working state. For example, the rise in elevation at 204 may increase the torque threshold to some degree so that the torque rise at 202 does not trigger a state change determination. However, the torque change at 206 may be sufficient to surpass the increased torque threshold to thereby indicate that the vehicle has entered a working state.

In another example, vehicle path data relative to turns may be used to modify the vehicle state determination. For example, a measured vehicle turn that is too tight indicates that the associated implement is not in the ground. Vehicle turn information may be obtained via accelerometer data, for example. In some embodiments, gyroscope measurements may also be utilized in order to, for example, distinguish actual vehicle turns from the vehicle merely tilting from side to side while moving along the terrain.

Figure 4:
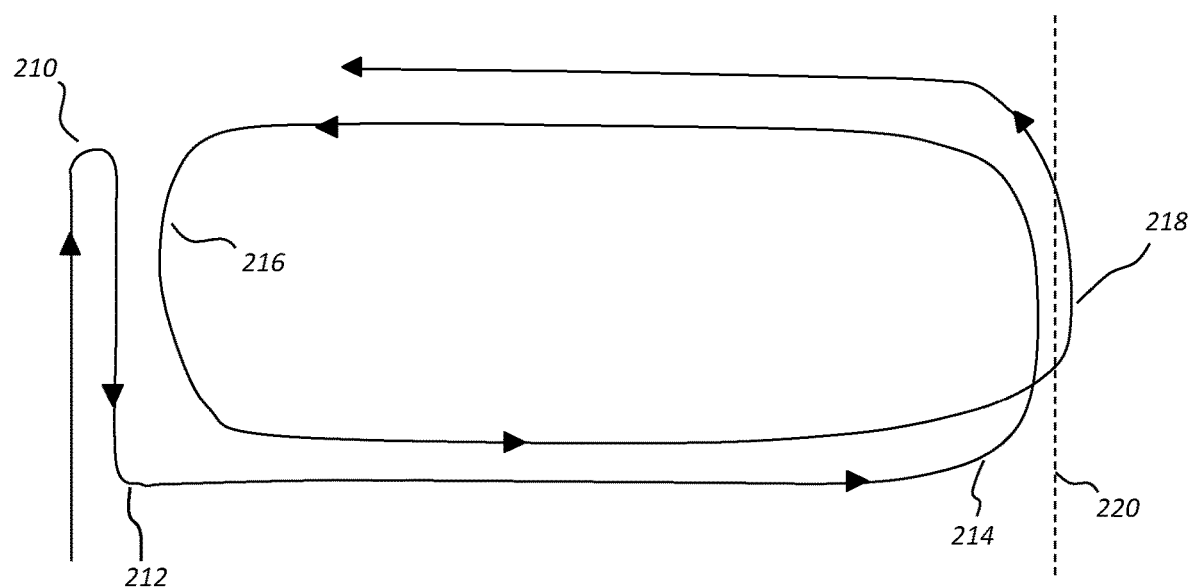
FIG. 4 schematically illustrates a method of determining whether a vehicle is in a working state or non-working state based at least in part on determining turning radii.

This example is illustrated schematically by FIG. 4. As shown, a tracked vehicle path first makes turn 210, followed in sequence by turns 212, 214, 216, and 218. The turning radius at turns 210 and 212 may be measured to be too small to indicate that the vehicle is in a working state (e.g., too small to indicate that an implement is in the ground), whereas the turning radii at turns 214, 216, and 218 are large enough to allow for a determination that the vehicle is in a working state (e.g., that the implement is in the ground).

Because several different factors may be utilized in making the vehicle state determination, the different factors may be assigned different relative weights. For example, PTO engagement information, when available and relevant, may carry far greater weight than accelerometer-based information. On the other hand, a determination that a turn radius is smaller/tighter than a threshold appropriate for the particular vehicle can carry greater weight than engine torque or other factors that would otherwise indicate that the vehicle is in the working state. As described above, the relative weights assigned to the various usable factors may be tuned using one or more machine learning algorithms.

FIG. 4 also illustrates another mapping operation that the computer system may be configured to perform (e.g., using the mapping engine 124 shown in FIG. 1). As vehicle path information is tracked by the computer system, field boundaries can be estimated based on the extent of vehicle travel, detected turning points, and/or movements while in a detected working state. For example, where the vehicle path includes a series of adjacent turns that together approximate a line, the computer system may operate to determine a field boundary approximated by the line. Line 220 is an example of such an estimated field boundary based on the adjacent turns 214 and 218.

Location Data Smoothing

Because a typical GPS chip can only consistently provide accuracy to within ±about 30 feet, the rendered location of a tracked vehicle will appear to "flutter" or "drift" even though the vehicle in actuality is not moving as erratically. A tracked vehicle will likely be much smaller than the dimensional accuracy of the GPS chip (an implement may only be about 20 feet wide, for example). Rendering the actual acreage that has been worked using fluttered and erratic vehicle paths is not useful. Accurately monitoring agricultural operation progress requires accurate rendering of vehicle paths. More accurate GPS location data may be achieved using differential correction from a nearby (e.g., within about a mile) land-based signal station. However, this approach requires additional equipment along with its concomitant setup and maintenance costs, or at least the costs associated with paying third parties for access to such a base station network.

Some embodiments may utilize a comparative filtering process to filter geolocation data points and result in a "smoothed" set of geolocation points that can more effectively be used to construct a vehicle path. The comparative filtering process is also a variable bit rate process that reduces the number of data measurements that need to be logged/stored and transmitted.

Figure 5A:
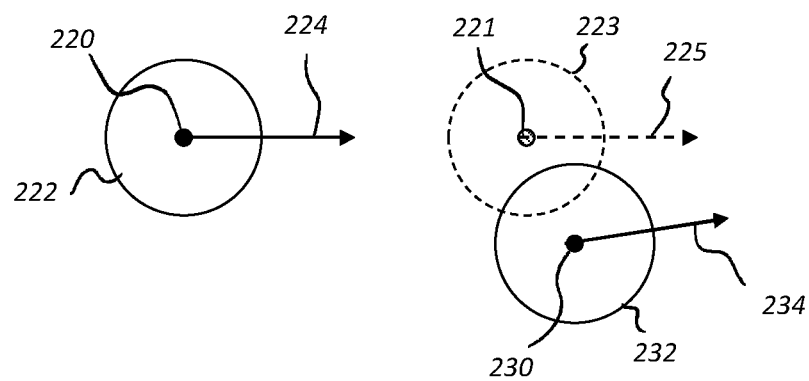
FIGS. 5A and 5B schematically illustrate a method of smoothing a vehicle path by using a comparative filtering process to filter out certain measured vehicle locations.
Figure 5B:
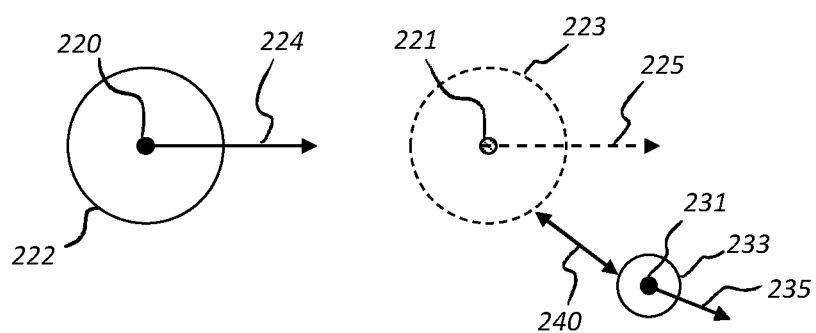

The comparative filtering process is schematically illustrated in FIGS. 5A and 5B. A first geolocation 220 is received from the GPS unit. The first geolocation 220 is associated with an error probability 222, shown here as a circle with a diameter that is inversely proportional to the locational accuracy of the point 220. Some measured geolocations will be associated with less accuracy (i.e., will have larger error ranges) than others. For example, the number and positions of satellites may vary throughout the day and/or at different locations along a vehicle path, which will typically result in a set of points having varying error probabilities.

Vehicle speed and bearing information may also be obtained to calculate vector 224. Speed and bearing information is readily available from most conventional mobile devices with GPS functionality, though it could also be obtained from raw sensor data.

Based on the first geolocation 220, its associated bearing 224, and the amount of time that has passed, a projected geolocation 221 is determined. The projected geolocation 221 is associated with a projected error probability 223 and projected vector 225 that correspond to the measured error probability 222 and measured vector 224. That is, the projected geolocation 221 "inherits" the error probability and vector of the first measured geolocation 220. The projected geolocation may be determined, for example, as the projected location of the vehicle after about 2 seconds of travel at the speed and in the direction of the first measured bearing 224. The rate of 2 seconds is an example only and although sufficient for most agricultural applications, higher or lower rates may be used according to processing requirements and/or preferences.

A second geolocation 230 may then be measured. As with the first geolocation 220, the second geolocation 230 is associated with an error probability 232. In the example shown in FIG. 5A, the second error probability 232 significantly overlaps with the projected error probability 223. In this example, the distance between the extent of the second error probability 232 and the extent of the projected error probability 223 is below a predetermined threshold, or in other words the overlap between the second error probability 232 and the projected error probability 223 is above a predetermined threshold. In this case, the second geolocation 230 and its associated vector 234 are not stored or used as part of the vehicle path. The next projected geolocation will thus be calculated by using the first geolocation 220 and its associated vector 224 again. For example, given a 2 second reporting rate, the next projected geolocation may be calculated as the projected location of the vehicle after 4 seconds of travel at the speed and in the direction of the first measured bearing 224. This process continues until a subsequent measurement is sufficiently different from the projected geolocation to warrant storage and incorporation into the mapping of the vehicle path.

In the example shown in FIG. 5B, a subsequent geolocation 231 has a smaller error probability 233. If the distance 240 between the extent of the error probability 233 and the extent of the projected error probability 223 is above a predetermined threshold, the subsequent geolocation 231 is stored and incorporated into the mapping of the vehicle path. The next projected geolocation would then be calculated using the stored geolocation 231 and its associated vector 235.

The comparative filtering process beneficially provides a smoothing effect to the data used to generate the vehicle path. For example, where the GPS unit loses one or more satellites and the error probability increases, the likelihood of those lower quality points being stored and used is lower. The comparative filtering is therefore inherently weighted against inclusion of lower quality measurements. The comparative filtering process also reduces the number of data points needed to generate the vehicle path, reducing data storage and data transfer costs. For example, in a typical agricultural operation, the variable rate resulting from the comparative filtering process has been shown to reduce data storage and transmission requirements (before compression) by about 50 to 75% as compared to a constant 2 second rate. Of course, these data storage and transmission benefits may be even greater in other circumstances since it is dependent on variations in GPS signal strength, the chosen baseline measurement rate, the relative complexity of the vehicle path, the size of the predetermined distance threshold 240, and the like.

The comparative filtering process also beneficially provides a clean initial set of vehicle geolocations which may be subject to one or more further layers of modifications. For example, the tiling process described in the Appendix may be utilized on top of an initial comparative filtering process.

Tracing Functions

The computer system may also be utilized to provide one or more tracing functions. For example, the field position from which a particular load was harvested may be traced to its location in storage. The location in storage may be stored as a GPS coordinate, for example.

Some embodiments may include additional tracing functions. For example, seed information (e.g., seed type, seed brand, seed batch number) may be traced to corresponding locations in the field where that particular seed is planted. In one embodiment, the tracing method includes determining a series of geolocations of a planter within a field and determining a planter path indicating a path traversed by the planter over a predetermined time period. The computer system may then divide the planter path into a series of seed paths, each seed path corresponding to a different seed parameter (e.g., seed type, seed brand, seed batch number), and each seed path therefore indicating an area of the field where seed having the respective parameter is planted. The computer system may then render the planter path on a map display that indicates the separate seed paths within the overall planter path.

Figure 6:
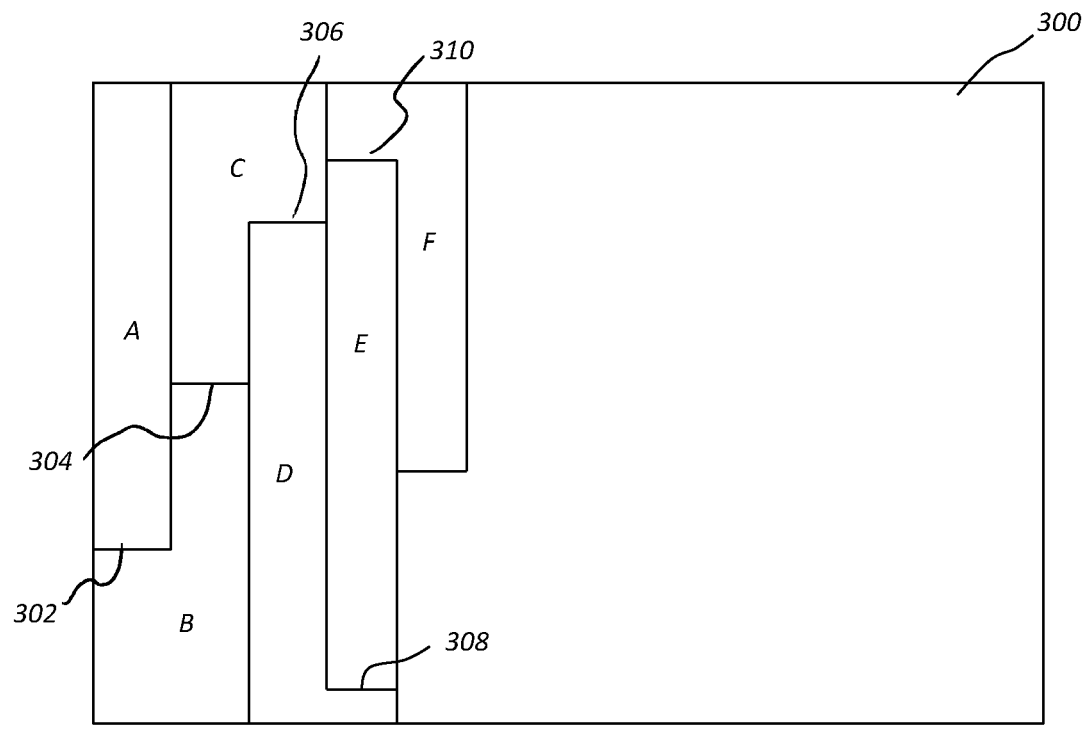
FIGS. 6 and 7 illustrate exemplary rendered maps showing different field sections.

FIG. 6 is one example of a generated tracing map 300. FIG. 6 shows separate vehicle path sections A through F separated by demarcations 302 through 310. The separate sections may be demarcated as shown and/or may be rendered in different colors, different shading, or otherwise visually distinguished from one another. Each field section A through F corresponds to a different seed parameter. The demarcations may be determined based on manual input by a user and/or by determining that a vehicle event occurred at the demarcation. For example, locations where the planter was idle for a sufficient length of time may be determined to be locations where seed was loaded. Additionally, or alternatively locations where the planter was in sufficient proximity to a service vehicle for a sufficient length of time may suggest that the service vehicle was delivering seed to the planter.

Other operational settings may also be traced and mapped to field locations in a similar manner. For example, field locations may be demarcated based on different fertilizer parameters (e.g., type, application levels), different pesticide or herbicide parameters (e.g., type, application levels), different implement settings (e.g., plow or disc depth), or other operational differences that can be tracked by the system.

Yield Map

Figure 7:
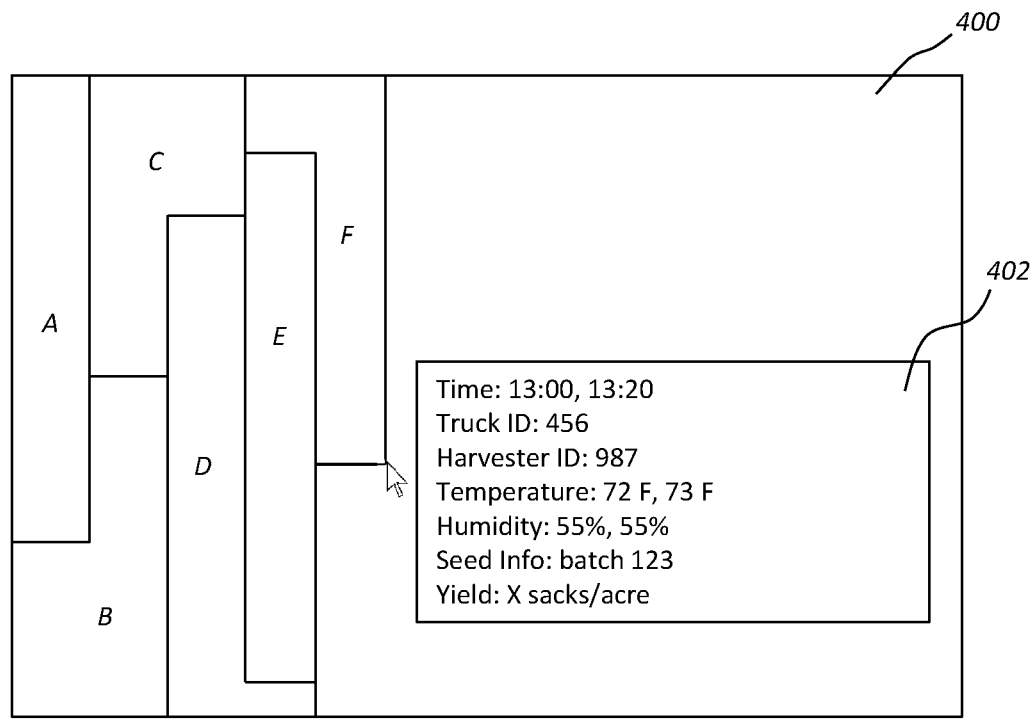

Through operation of the computer system, the areas from the field from which different harvested loads were obtained can be demarcated and rendered on a map. In some embodiments, such load maps may be augmented by providing yield information. FIG. 7 illustrates an example of a rendered map interface 400 showing the field locations A through F from which separate loads were obtained. The interface displays load information when selected by the user. For example, the load information display 402 may be displayed in response to hovering a mouse pointer over a selected field section (section "F" in this example), by clicking the field section, touching the field section, or otherwise selecting the field section. As shown, the information display 402 can display various pieces of load information such as: harvest time (start, finish); equipment identification information; temperature, humidity, or other sensor information at harvest; and seed information. Other types of information may also optionally be displayed such as fertilizer or pesticide information related to the section, and/or crew and operator information.

The interface may also display a yield estimate for the selected section. The yield estimate may be calculated, for example, using previously entered loading truck registration data (which provides the capacity of the load truck associated with the load), the width of the harvester (to determine area of the load), and optionally a tare factor that accounts for typical non-product weight in a load. In some embodiments, the map may visually distinguish sections based on the yield estimates. For example, the sections may be shaded/colored so that the higher the yield estimate, the darker the shading/color, or may be colored according to percentiles (e.g., each quartile has a different color), predetermined ranges, or other suitable factor.

The invention claimed is:

1. A computer system configured to map an agricultural operation according to different states of the agricultural vehicle, the computer system comprising:
   one or more processors; and
   one or more hardware storage devices having stored thereon computer-executable instructions which are executable by the one or more processors to cause the computer system to at least:
     receive vehicle location information providing a series of geolocations of an agricultural vehicle;
     based on the received vehicle location information, determine a vehicle path for the vehicle, the vehicle path indicating a path traversed by the vehicle over a given time period;
     receive sensor information from one or more vehicle-associated sensors at different sections along the vehicle path;
     based at least in part on the received vehicle sensor information, determine whether the vehicle is in a working state or a non-working state at each of the different sections; and
     render the vehicle path on a map display, the map display visually distinguishing between sections of the vehicle path traversed while the vehicle is in the working state and sections of the vehicle path traversed while the vehicle is in the non-working state,
     wherein the received sensor information comprises one or more of accelerometer data, gyroscope data, and GPS data.

2. The computer system of claim 1, wherein the computer-executable instructions are further configured to cause the computer system to determine that the vehicle is in the working state when sensed vibrations, as determined from the accelerometer data, exceed a predetermined threshold, and to determine that the vehicle is in the non-working state when the sensed vibrations fall below the predetermined threshold.

3. The computer system of claim 1, wherein the computer-executable instructions are further configured to cause the computer system to receive engine torque data, and to determine whether the vehicle is in a working state or non-working state at each of the different sections based on the received engine torque in addition to the received vehicle sensor information, wherein the computer-executable instructions are further configured to cause the computer system to determine that the vehicle is in the working state when the engine torque exceeds a predetermined threshold.

4. The computer system of claim 3, wherein the computer-executable instructions are further configured to cause the computer system to compare an elevation gain, obtained from the GPS data, with the engine torque, and to offset the torque threshold based on the elevation gain.

5. The computer system of claim 4, wherein the computer-executable instructions are further configured to cause the computer system to increase the torque threshold when a torque increase corresponds with an elevation gain.

6. The computer system of claim 5, wherein the computer-executable instructions are further configured to cause the computer system to decrease the torque threshold when a torque decrease corresponds with an elevation decrease.

7. The computer system of claim 1, wherein the computer-executable instructions are further configured to cause the computer system to determine whether the vehicle is in the working state or the non-working state based at least in part on one or more measured vehicle path turns.

8. The computer system of claim 7, wherein the computer-executable instructions are further configured to cause the computer system to determine the one or more vehicle path turns using accelerometer data and optionally gyroscope data.

9. The computer system of claim 8, wherein the computer-executable instructions are further configured to cause the computer system to negate a determination that a vehicle turn has occurred when the gyroscope data indicates a side to side tilt of the vehicle.

10. The computer system of claim 7, wherein the computer-executable instructions are further configured to cause the computer system to determine that the vehicle is in the non-working state when a vehicle path turn has a turning radius smaller than a predetermined turning radius threshold.

11. The computer system of claim 1, further configured for tracing different agricultural operational settings to corresponding sections within a field, wherein the computer-executable instructions are further configured to cause the computer system to at least:
receive or determine operational setting information at a plurality of different geolocations along the vehicle path, the operational setting information indicating a particular operational setting of the vehicle at the corresponding geolocation among a set of potential operational settings;
based on the operational setting information, add one or more demarcations to the vehicle path that divide the vehicle path into multiple sections, each demarcation representing a location at which the operational setting of the vehicle was changed; and
wherein the different sections of the vehicle path are each displayed according to the operational setting corresponding to the section.

12. The computer system of claim 11, wherein the operational setting information is based on a seed parameter, a fertilizer parameter, or a pesticide parameter.

13. The computer system of claim 1, further configured for mapping different loads of a harvested product to corresponding sections within a field, wherein the computer-executable instructions are further configured to cause the computer system to at least:
receive harvester location information providing a series of geolocations of a harvester;
based on the received harvester location information, identify a harvester path;
determine one or more unload locations along the harvester path, the one or more unload locations representing a location at which a load truck finished receiving a load from the harvester;
based on the determined unload locations, divide the harvester path into a set of multiple field sections, each field section corresponding to a particular load, and each field section therefore indicating an area in the field from which the corresponding load was obtained;
render the harvester path on a map display, the map display indicating the multiple field sections; and
display a yield estimate for one or more of the field sections.

14. The computer system of claim 13, wherein the computer-executable instructions are further configured to cause the computer system to:
receive harvester information for a harvester, the harvester information indicating a working width of the harvester;
receive load truck information for one or more load trucks, the load truck information indicating the capacity of each of the one or more load trucks; and
determine an area of a particular field section based on the harvester information; and
determine the yield estimate for the particular field section based on the determined area of the field section and based on the capacity of the load truck associated with the corresponding load.

15. The computer system of claim 13, wherein the computer-executable instructions are further configured to cause the computer system to determine the one or more unload locations based on measuring a time period for which a geolocation of the harvester and a geolocation of a loading truck are within a threshold proximity to one another.

* * * * *